US006366827B2

(12) United States Patent

Krasuski et al.

(10) Patent No.: US 6,366,827 B2

(45) Date of Patent: *Apr. 2, 2002

(54) SYSTEM FOR PREPARING MAIL ITEMS

(75) Inventors: Marek Krasuski, Fontenay Aux Roses; Dominique Mazeiller, La Frette, both of (FR)

(73) Assignee: Neopost Industrie, Bagneax (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,083

(22) Filed: Sep. 23, 1998

(30) Foreign Application Priority Data

Sep. 23, 1997 (FR) ........................................... 97 11798

(51) Int. Cl.[7] ................................................ G06F 7/00

(52) U.S. Cl. ....................... 700/220; 700/223; 700/228; 700/230

(58) Field of Search ........................... 380/21; 709/400, 709/410, 406, 405; 700/220, 222, 227; 705/408

(56) References Cited

U.S. PATENT DOCUMENTS

| | | | | | |
|---|---|---|---|---|---|
| 4,202,150 | A | | 5/1980 | Petersson | |
| 5,060,165 | A | * | 10/1991 | Schumacher et al. | 364/478 |
| 5,429,349 | A | * | 7/1995 | Supron et al. | 271/199 |
| 5,475,603 | A | * | 12/1995 | Korowotny | 364/478 |
| 5,546,577 | A | * | 8/1996 | Marlin et al. | 395/600 |
| 5,644,486 | A | * | 7/1997 | Chang et al. | 364/132 |
| 5,649,408 | A | | 7/1997 | Mazeiller | |
| 5,650,934 | A | * | 7/1997 | Manduley | 364/478.08 |
| 5,684,706 | A | * | 11/1997 | Harman et al. | 364/464.16 |
| 5,729,461 | A | * | 3/1998 | D'Andrea et al. | 364/464.18 |
| 5,756,074 | A | * | 5/1998 | Marlin et al. | 395/200.8 |
| 5,778,377 | A | * | 7/1998 | Marlin et al. | 707/103 |
| 5,936,865 | A | * | 8/1999 | Pinstov et al. | 364/478.14 |
| 5,980,443 | A | * | 11/1999 | Kayser et al. | 493/420 |
| 5,982,896 | A | * | 11/1999 | Cordery et al. | 380/21 |
| 6,009,416 | A | * | 12/1999 | Pinstov et al. | 705/410 |
| 6,026,385 | A | * | 2/2000 | Harvey et al. | 705/408 |
| 6,030,132 | A | * | 2/2000 | Harman et al. | 400/62 |
| 6,032,122 | A | * | 2/2000 | Gertner et al. | 705/8 |
| 6,073,167 | A | * | 6/2000 | Poulton et al. | 709/206 |
| 6,157,919 | A | * | 12/2000 | Cordery et al. | 705/60 |

FOREIGN PATENT DOCUMENTS

| | | | |
|---|---|---|---|
| EP | 0612 036 | A1 | 8/1994 |
| EP | 0 621 563 | A1 | 10/1994 |
| EP | 0 745 435 | A2 | 12/1996 |
| EP | 0 762 336 | A2 | 3/1997 |

* cited by examiner

*Primary Examiner*—Christopher P. Ellis
*Assistant Examiner*—Michael E. Butler
(74) *Attorney, Agent, or Firm*—Sughrue Mion, PLLC

(57) ABSTRACT

A system for preparing mail items, the system comprising a general-purpose computer for preparing a document to be sent, a secure metering device connected to the general-purpose computer via a secure link so as to send it postage metering or "franking" information, a printer connected to the general-purpose computer so as to print both the document to be sent, and at least a destination address for the document and a postage imprint on an envelope that is to receive the document, and a folder/inserter connected both to the printer and to the general-purpose computer so as to receive and fold the printed document and so as to insert it into the corresponding franked envelope.

5 Claims, 3 Drawing Sheets

SYSTEM FOR PREPARING MAIL ITEMS

TECHNICAL FIELD

The present invention relates to the field of mail handling, and in particular to postage meters or "franking machines" for preparing mail fully, ready for posting.

PRIOR ART

The market currently offers no system in an office environment that is completely self-contained and that prepares mail items fully, ready for posting.

The Applicant's European Patent Application EP 0 612 036 proposes a mail-handling system that folds documents delivered directly by a word-processing system and inserts them into envelopes. However, it is possible to send the resulting mail item only if the envelope bears the destination address and the right amount of postage, which means that, at the very least, a postage meter must be added to the system.

European Patent Application EP 0 265 192 discloses a mail-handling system associating the following around a central computer (system controller): firstly a laser printer followed by a folder/inserter for folding documents and inserting them into envelopes, and secondly an ink jet printer for printing the destination addresses on the envelopes. It should be noted that such a system does not print postage amounts on the resulting mail items. Furthermore, printing addresses directly on envelopes containing documents suffers from drawbacks (with respect to printing quality) due to the different thicknesses of the envelopes.

The problem of printing quality is solved in Patent Application EP 0 745 435 by printing the envelopes before the documents are inserted into them. The empty envelopes are printed by an ink jet printer, with the documents being printed independently by a laser printer. However, the system for preparing mail items described in that document remains complex, in particular with respect to the paths followed by the mail items, and it requires a number of components such that it cannot be used in practice in an office environment in which inevitably only a small amount of space is available.

OBJECTS AND DEFINITION OF THE INVENTION

An object of the present invention is to provide a system that is completely self-contained, that can be used very simply in a conventional office environment, and that is designed to perform all of the handling of a mail item from producing the individual document(s) making up the mail item to closing the item so that it can be sent, including folding the documents and inserting them into an envelope and printing all the necessary information on the envelope, in particular the destination address and the amount of the postage or "postage imprint".

This object is achieved by a system for preparing mail items, the system comprising a general-purpose computer for preparing a document to be sent, a secure metering device connected to the general-purpose computer via a secure link so as to send it postage metering or "franking" information, a printer connected to the general-purpose computer so as to print both the document to be sent, and at least a destination address for the document and a postage imprint on an envelope that is to receive the document, and a folder/inserter connected both to the printer and to the general-purpose computer so as to receive and fold the printed document and so as to insert it into the corresponding franked envelope.

Thus, with the structure of the invention, all of the functions required for preparing a mail item are performed with an ordinary conventional printer (and its associated computer) and a folder/inserter connected to the printer.

The printer comprises an envelope-feed magazine, a document-feed magazine, a print module connected either to the envelope-feed magazine or to the document-feed magazine so as to print successively the envelope and the documents, and a document outlet connected to the print module so as to deliver the envelopes and the documents to the folder/inserter, a control module also being provided for controlling printing of and synchronizing conveying of the envelopes and documents as a function of instructions received from the general-purpose computer.

Advantageously, the printer further comprises a document-receiving magazine connected to the print module so as to extract printed documents that are not to be sent.

Preferably, the print module comprises one of the following two elements: a laser print drum or an ink jet print head.

The folder/inserter comprises an accumulator module connected to a document inlet designed to co-operate with the document outlet of said printer so as store, when necessary, the various documents corresponding to a given envelope, a folding module connected either to the document inlet or to the accumulator module to fold the documents before they are inserted into the envelope, a turn-around module connected to the document inlet so as to receive and position the envelope so that the documents can be inserted therein, and an inserter module connected to the folding module and to the turn-around module so as to insert the documents into the corresponding envelope and so as to eject the resulting mail item to a document outlet, a control module also being provided for controlling and synchronizing the various modules as a function of instructions received from the general-purpose computer.

Advantageously, the folder/inserter further comprises an additional feed module for feeding in advertising leaflets.

In an advantageous embodiment, the printer may be constituted by a print module integrated in the folder/inserter.

BRIEF DESCRIPTION OF THE DRAWINGS

Other characteristics and advantages of the present invention appear more clearly from the following description given by way of non-limiting example and with reference to the accompanying drawings, in which.

DETAILED DESCRIPTION OF A PREFERRED EMBODIMENT

Figure 1:
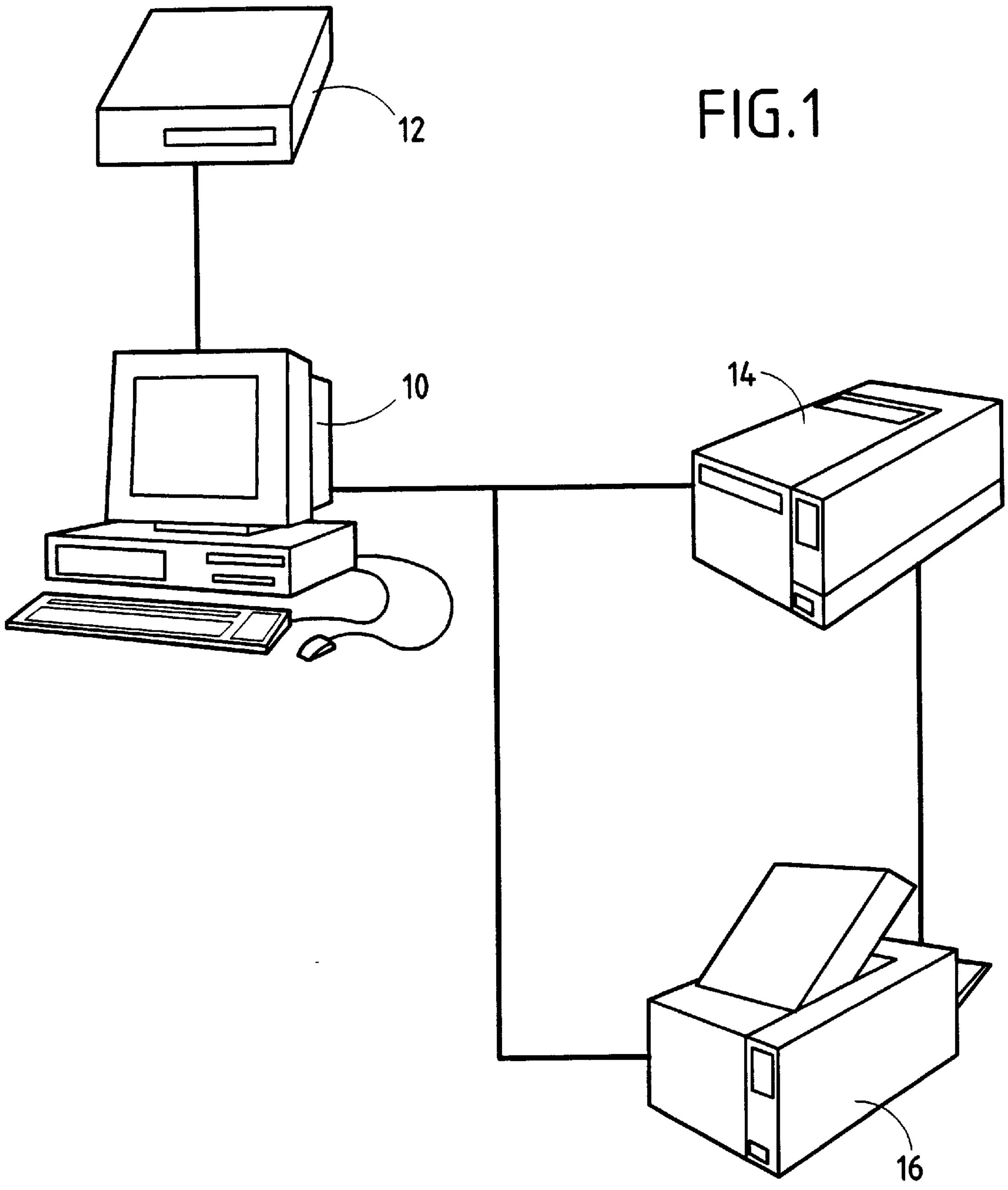
FIG. 1 is a diagram showing a self-contained system of the invention for preparing mail.

FIG. 1 is a diagrammatic view of a self-contained system of the invention for preparing mail. The system is made up of four main components: a computer 10, a secure metering device (SMD) 12, a digital printer 14, and a folder/inserter 16.

The computer 10 is a general-purpose computer, e.g. a personal computer (PC) or the like (but a network workstation or a network computer may also be suitable) and it conventionally comprises a central processor connected via a bus to program memories (e.g. of the ROM type) and read/write memories (of the RAM type or of an equivalent type), and to input/output modules. Such modules provide interfaces between the central processor and various devices such as a keyboard or any other conventional input device such as a pointing device, a display device such as a liquid crystal screen, a data-storage device such as a hard disk, and the SMD, or the digital printer.

The SMD 12 performs the accounting functions generally associated with a conventional postage meter. It delivers postage information (advantageously, encoded information) to the computer 10 so that said computer can transmit the amounts of postage to be printed (postage imprint or stamp) to the digital printer 14. The link between the SMD and the computer is a secure communications link, i.e. it is protected against unauthorized interception. In a variant (not shown), the SMD may also be housed in the computer and the data is secured by means of suitable enciphering software. The types of communication that can take place between the computer 10 and the SMD 12 are described in detail in the Applicant's U.S. patent application Ser. No. 56 2268 to C. Shah and K. Robertson.

The digital printer 14 is a general-purpose printer, e.g. a laser printer or an ink jet printer, and it can therefore be used by the computer 10 in entirely conventional manner. In particular, as well as printing postage imprints, it can be used like any printing terminal for printing documents in association with standard software available on the market, such as Word, Excel, or Access, for example, (Microsoft Corporation software), installed in the computer 10.

The folder/inserter 16 may be a conventional folder/inserter of the type described in the Applicant's Patent EP 0 652 392 and to which a specific envelope feed interface is added, or else the folder/inserter may be specially designed for the mail preparation system of the invention, as explained in more detail below.

Figure 2:
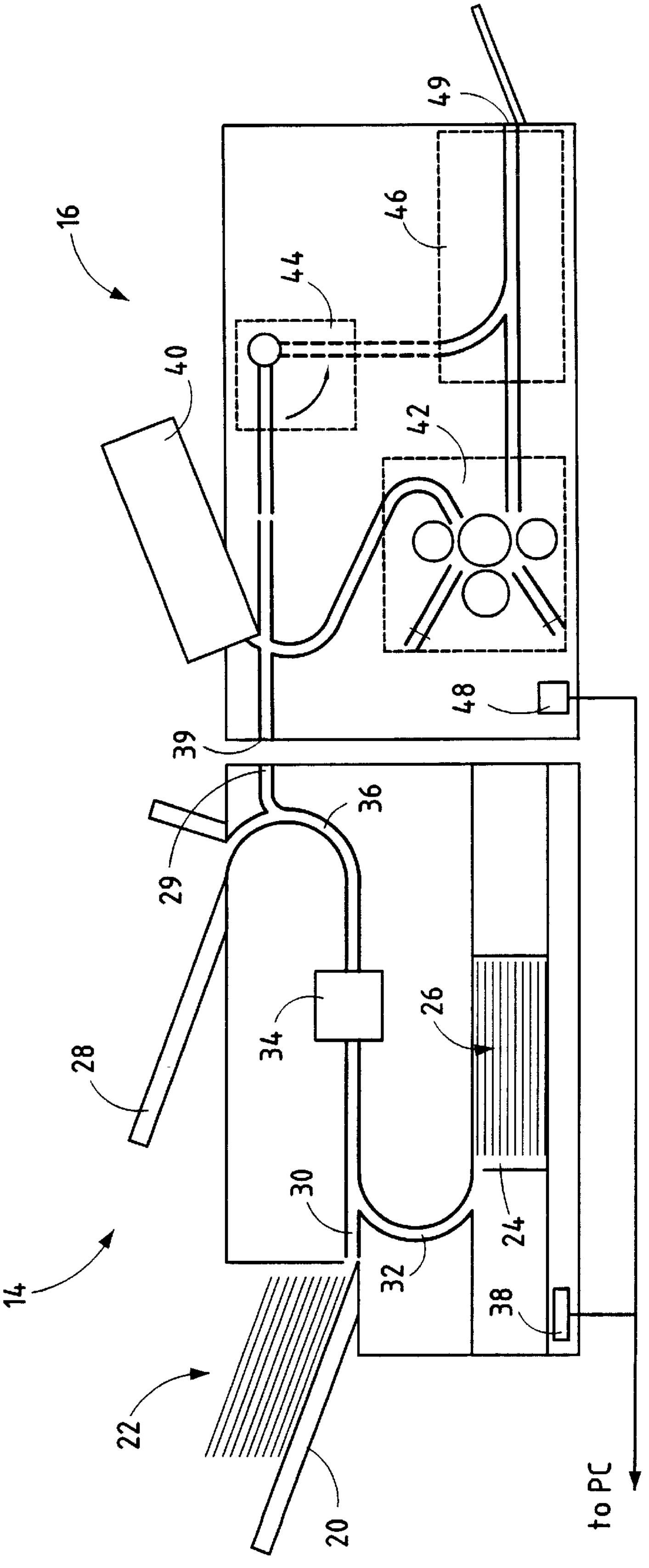
FIG. 2 shows the paths followed by a mail item in the system shown in FIG. 1.

FIG. 2 is a more detailed view of the structure of the printer 14 and of the structure of the folder/inserter 16, and it shows diagrammatically the paths followed by the mail items in these two components. The printer 14 is conventionally provided with a first feed magazine 20 for receiving empty envelopes 22, and with a second feed magazine 24 for receiving blank paper on which documents are to be printed 26. The second magazine is conventionally in the form of a slot-in front-loading tray. Respective document paths 30, 32 make it possible to convey the envelopes and the paper to a printing module 34 (the conveyor rollers and the motors for driving them are not shown). The printing module is advantageously constituted either by a print drum (for a laser printer) or by print heads (for an ink jet printer). At the outlet of the printing module, a document path 36 makes it possible to direct the printed object (envelope or document) to one or other of the two outlets of the printer. The first outlet makes it possible to feed a magazine 28 (conventionally placed on top of the printer) for receiving the printed documents when the printer is used conventionally in association with a general-purpose computer 10, the second document outlet 29 (advantageously placed at the back of the printer) serving to feed the folder/inserter directly via its document inlet. Naturally, a control module 38 is provided at the printer for controlling printing and for synchronizing conveying of the documents and envelopes on the basis of instructions received from the general-purpose computer 10.

The folder/inserter 16 is essentially made up of four modules. The first module 40 is a document accumulator serving to store documents that relate to a given mail item, i.e. that need to be put in the same envelope. The second module 42 is a conventional folding module provided with pockets or "buckle chutes" and receiving the documents to be folded either directly from a document inlet 39 (when the envelope is to contain only one document) or from the document accumulator 40. The third module 44 is a special turn-around module designed to change the position of the envelope to facilitate inserting the documents into the envelope. At the outlet of the printer 14, the envelopes are conventionally positioned lengthwise, whereas the documents must be inserted widthwise. The Applicant's Patent Application filed the same day as the present Application and entitled "Dispositif de réorientation d'enveloppes" ("An envelope reorientation device") illustrates an embodiment of such a module. Finally, the fourth module 46 is a conventional inserter module which receives the empty envelope and the documents to be inserted therein, and performs the insertion. The resulting mail item is then ejected to a document outlet 49 of the folder/inserter. For reasons of simplification, the secondary modules have not been shown, although they are part of such a folder/inserter. For example, such secondary modules are constituted by a moistening module which sticks down the flaps of the envelopes after insertion, and by an additional advertising-leaflet feed module. Naturally, like the printer 10, the folder/inserter 16 is provided with a control module 48 for controlling the conveying and folding of documents, the conveying and turning around of envelopes, and the insertion of the documents into the corresponding envelopes, on the basis of instructions received from the computer 10.

Figure 3:
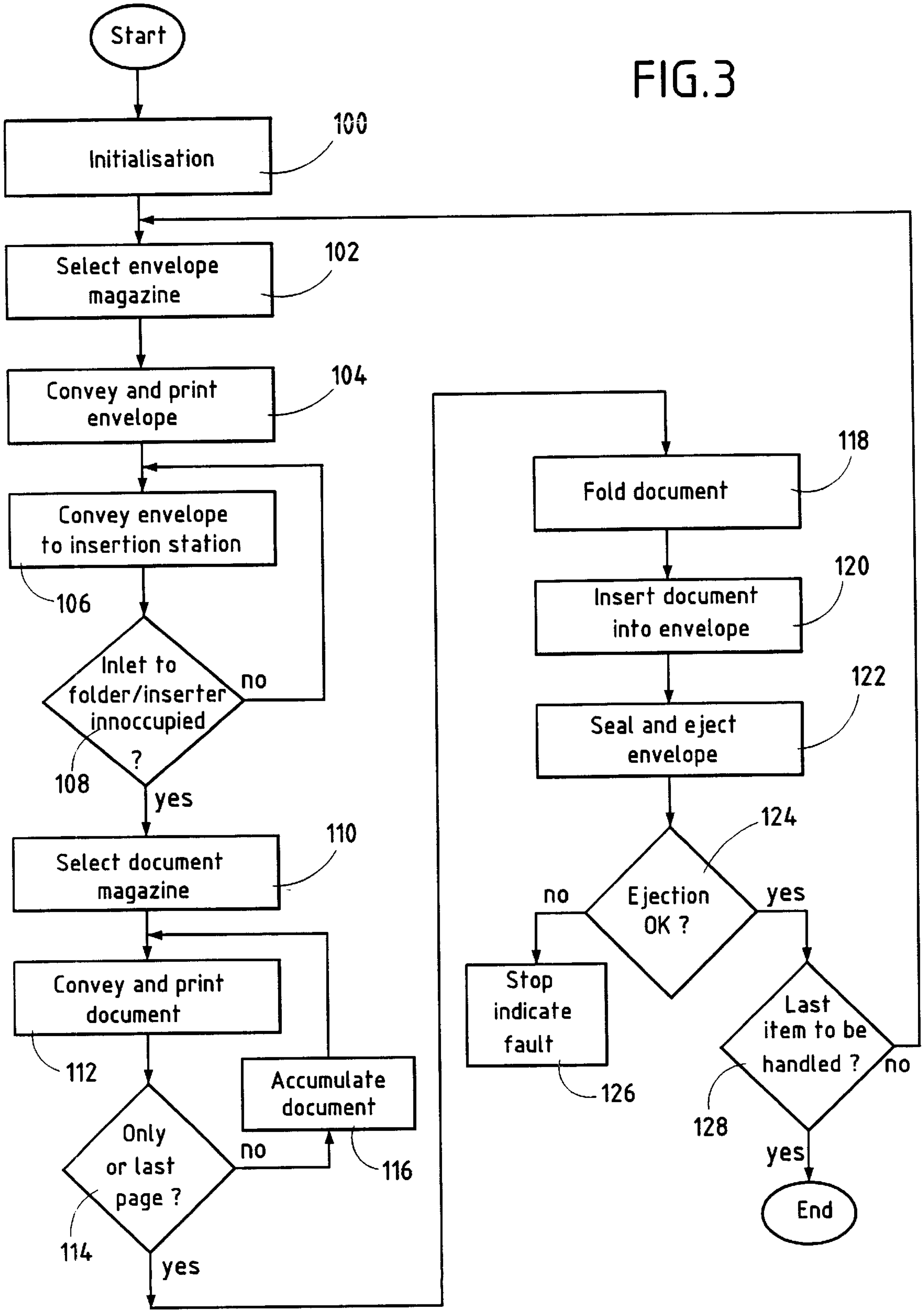
FIG. 3 is a flow chart showing how the system of the invention operates.

Operation of the system of the invention is now explained with reference to FIG. 3 which is a flow chart showing the operations performed during preparation of a mail item.

After an initialization step 100 in which the various parameters of the system are re-initialized, a step 102 is performed in which the first magazine 20 containing the empty envelopes 22 is selected. An envelope is then conveyed and printed in a step 104. At least the destination address and the postage imprint are printed. In a step 106, the resulting franked envelope is conveyed to the inlet of the inserter module 46 of the folder/inserter after it has been reoriented by the module 44. After a following step 108 of verifying that the inlet 39 of the folder/inserter is unoccupied, the second magazine 24 containing the blank documents 26 is selected in a step 110. A document is then conveyed and printed in a step 112. Depending on whether or not the printed document is the only document to be inserted into the pre-franked envelope (test at step 114), the document is stored in the accumulator module 40 in a step 116. Once all of the documents corresponding to the envelope have been printed (the answer to the above-mentioned test 114 is "yes"), the document(s) is/are folded by the folding module 42 in a following step 18, and is/are then inserted into the envelope at the inserter module 46 (step 120). Finally, in a step 122, the resulting mail item is sealed and ejected to the outlet of the folder/inserter 16. Absence of ejection is detected in a step 124 which triggers alarms both at the folder/inserter and at the computer 10 (step 126), and causes the handling process to be stopped. If the ejection takes place without incident, another test step 128 is performed to verify whether the handled mail item is the last item, in which case the handling process is stopped, or whether other mail items are waiting to be prepared, in which case the process returns to step 102 in which the envelope magazine is selected so as to prepare the following mail item.

Naturally, the present invention is not limited to the above-described preferred embodiment, and variants or additions may be considered without going beyond the ambit of the invention. It is possible to provide inscriptions other than the destination address and the postage imprint. For example, it is possible to print the sender's name and address or an advertising logo. Similarly, the computer may also be connected to a remote postage-crediting station located on postal administration premises or on the premises of any other authorized body. It can also be noted that the printer 14 may be replaced by a printing module integrated in the folder/inserter 16, the resulting assembly then being in the form of a specific and self-contained office-automation machine 15 for preparing mail.

What is claimed is:

1. A system for preparing mail items, the system comprising:

a general-purpose computer for preparing a document to be sent;

a secure metering device connected to the general-purpose computer via a secure link so as to sent said computer postage information;

a printer connected to the general-purpose computer so as to print both the document to be sent, and at least a destination address for the document and a postage imprint on an envelope that is to receive the document; and an inserter connected both to the printer and to the general-purpose computer so as to receive and fold the printed document and so as to insert the printed document into the corresponding franked envelope, wherein said printer includes:

an envelope feed magazine, a document-feed magazine, a print module connected to one of the envelope-feed magazine and the document-feed magazine so as to print successively the envelope and the documents, a document outlet connected to the print module so as to deliver the envelope and the documents to the inserter, and a first control module for controlling printing of and synchronizing conveying of the envelopes and documents as a function of instructions received from the general-purpose computer and wherein said inserter includes:

an accumulator module connected to a document inlet designed to co-operate with the document outlet of said printer so as to store the various documents corresponding to a given envelope, a folding module connected to one of the document inlet and the accumulator module to fold the documents before they are inserted into the envelope, a turn-around module connected to the document inlet so as to receive and position the envelope so that the documents can be inserted therein, an inserted module connected to the folding module and to the turn-around module so as to insert the documents into the corresponding envelope and so as to eject the resulting mail item to a document outlet, and a second control module for controlling and synchronizing the various module as a function of instruction received from the general-purpose computer.

2. A system for preparing mail items according to claim 1, wherein said printer further comprises a document-receiving magazine connected to the print module so as to extract printed documents that are not to be sent.

3. A system for preparing mail items according to claim 1, wherein said print module comprises one of: a laser print drum or an ink jet print head.

4. A system for preparing mail items according to claim 1, wherein said inserter further comprises an additional feed module for feeding in advertising leaflets.

5. A system for preparing mail items according to claim 1, wherein the printer is constituted by a print module integrated in the inserter.

* * * * *